(12) United States Patent
Krawietz et al.

(10) Patent No.: US 6,230,748 B1
(45) Date of Patent: May 15, 2001

(54) FLEXIBLE CONDUIT HAVING A CYLINDRICAL KNIT METAL WIRE ELEMENT

(75) Inventors: Tom Krawietz, Birkenfeld; Fabian Elsässer, Straubenhardt, both of (DE)

(73) Assignee: Witzenmann GmbH Metallschlauch-Fabrik Pforzheim, Pforzheim (DE)

( * ) Notice: Subject to any disclaimer, the term of this patent is extended or adjusted under 35 U.S.C. 154(b) by 0 days.

(21) Appl. No.: 09/655,885

(22) Filed: Sep. 6, 2000

Related U.S. Application Data

(63) Continuation of application No. 09/071,118, filed on May 4, 1998, now abandoned.

(30) Foreign Application Priority Data

May 2, 1997 (DE) .......................................... 297 07 908 U

(51) Int. Cl.[7] .................................................. F16L 11/00
(52) U.S. Cl. ...................... 138/121; 138/114; 138/148; 138/118; 138/123
(58) Field of Search .................................. 138/114, 148, 138/123, 121, 122, 118, 135

(56) References Cited

U.S. PATENT DOCUMENTS

| | | | |
|---|---|---|---|
| 2,125,447 | * 8/1938 | Jacobson ........................... 138/123 X |
| 3,073,353 | * 1/1963 | Rittenhouse ........................ 138/148 |
| 3,299,417 | * 1/1967 | Sibthorpe .......................... 138/148 X |
| 3,934,618 | * 1/1976 | Henderson .......................... 138/114 |
| 4,746,178 | 5/1988 | Perkins ............................. 285/114 |
| 5,145,215 | 9/1992 | Udell ................................ 285/49 |
| 5,600,752 | * 2/1997 | Lopatinsky ........................ 138/114 X |
| 5,660,419 | * 8/1997 | Kim ................................. 285/226 |
| 5,907,754 | * 5/1999 | Elsasser et al. ................... 138/118 |
| 6,062,266 | * 5/2000 | Burkhardt ........................ 138/114 |
| 6,116,287 | * 9/2000 | Gropp et al. ...................... 138/114 |
| 6,125,889 | * 10/2000 | Elsasser et al. ................... 138/118 |

FOREIGN PATENT DOCUMENTS

| | | |
|---|---|---|
| 8313268 | * 4/1984 | (DE) . |
| 3436982 | * 6/1988 | (DE) . |
| 9016982 | * 6/1988 | (DE) . |
| 3708415 | * 9/1988 | (DE) . |
| 4328858 | * 12/1995 | (DE) . |
| 0 493 680 | 7/1992 | (EP) . |
| 736714 | * 10/1996 | (EP) . |
| 2545907 | * 11/1984 | (FR) . |

* cited by examiner

*Primary Examiner*—Patrick Brinson
(74) *Attorney, Agent, or Firm*—Venable; Gabor J. Kelemen

(57) ABSTRACT

A flexible conduit includes a corrugated tubular metal bellows having a minimum inner diameter; cylindrical end fittings secured to the bellows; a metal hose disposed coaxially within the bellows and having a maximum outer diameter which is less than the minimum inner diameter of the bellows; and a free annular cylindrical space situated between the bellows and the metal hose. The cylindrical space has an outer diameter equaling the minimum inner diameter of the bellows and an inner diameter equaling the maximum outer diameter of the metal hose. The conduit further has a hollow cylindrical knit wire element positioned in the cylindrical space. The knit wire element radially fully occupies the cylindrical space without projecting radially therefrom.

19 Claims, 8 Drawing Sheets

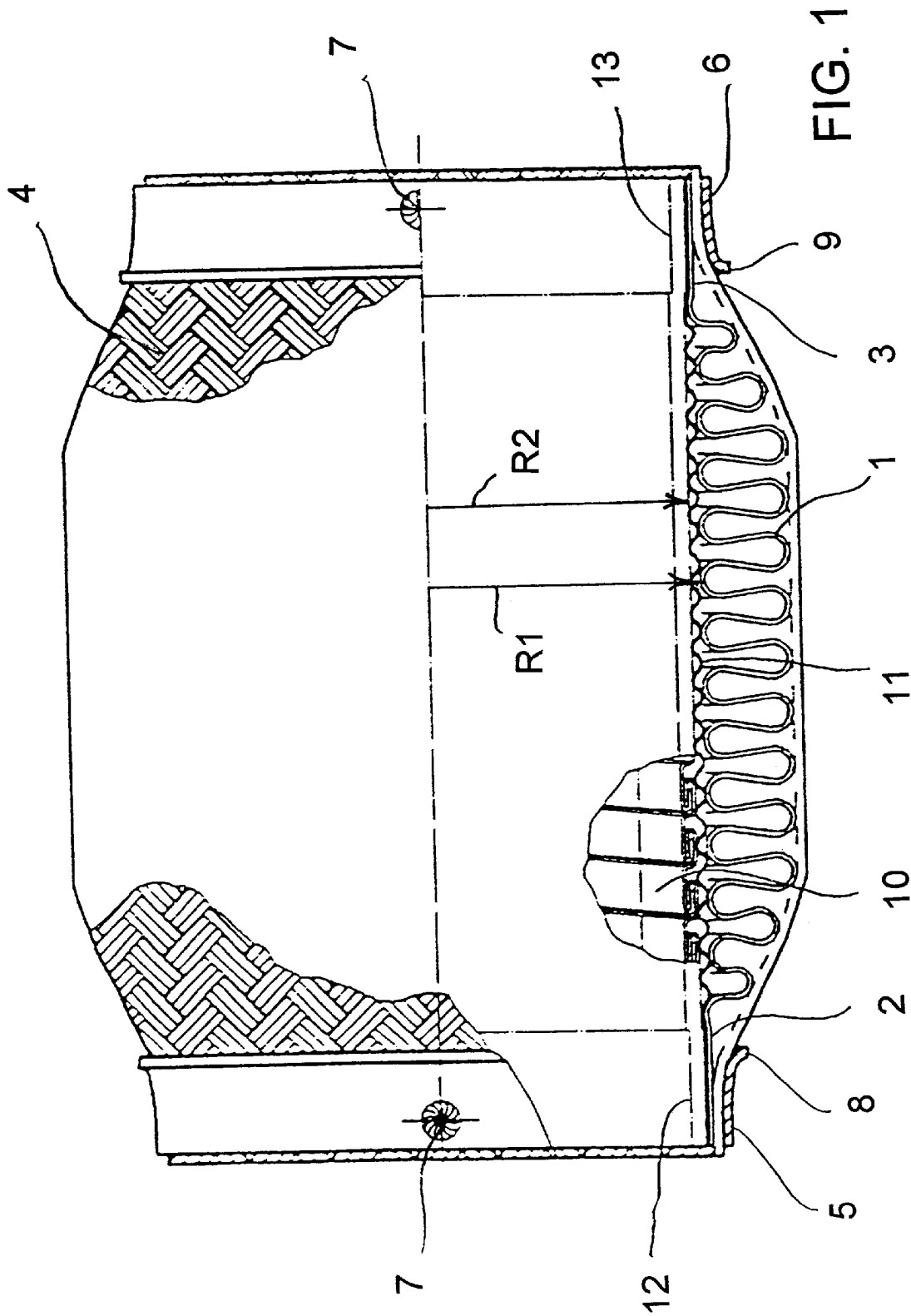

FLEXIBLE CONDUIT HAVING A CYLINDRICAL KNIT METAL WIRE ELEMENT

CROSS REFERENCE TO RELATED APPLICATION

This application is a continuation of application Ser. No. 09/071,118 filed May 4, 1998 now abandoned.

This application claims the priority of German Patent Application No. 297 07 908.5, filed May 2, 1997, the subject matter of which is incorporated herein by reference.

BACKGROUND OF THE INVENTION

This invention was made for the purpose of constructing a flexible conduit element, especially for the exhaust systems of combustion engines in vehicles, and in particular, the invention is directed to helically or annularly corrugated metal bellows equipped with cylindrical end fittings and a metal hose which is located coaxially inside the bellows, where the outside diameter of the metal hose is smaller than the free (smallest) inside diameter of the bellows and the ends of the metal hose are lying inside the end fittings of the bellows, are flush with those fittings, and are fixed to them, with at least one hollow cylindrical element made of metal wire being arranged between the bellows and the metal hose. In this well-known type of conduit element, a braided hose is used as the metal wire element arranged between the bellows and the metal hose in order to improve the damping of vibrations. At least one of the ends of the braided hose is fixed inside an end fitting of the corresponding bellows. The damping effect of this design, however, was found to be quite low since the braided hose lies loosely in the cavity between the bellows and the metal hose and is in contact only with the bellows in order to have a damping effect. The damping effect is therefore subject to accidental conditions in the operation of the conduit element. Furthermore, the braided hose requires the fixing of at least one of its ends. In addition thereto, the braided hose causes a comparably high material consumption due to its design. Finally, the braided hose is particularly incapable of keeping the metal hose in a radially constant position inside the bellows. Under unfavorable operating conditions the metal hose may collide with the interior walls of the bellows. Conventionally, additional elements are to be packed into the cavity between the metal hose and the bellows to avoid such effects. As a consequence, the manufacturing costs of such a conventional conduit element are high and its installation is difficult.

SUMMARY OF THE INVENTION

It is therefore an object of the invention to provide an improved conduit element of the above-described type in which only one element made of metal wire is used for the purpose of vibration damping in the conduit element, and filling the cavity between the bellows and the metal hose at least locally without gaps. It is a further object to reduce considerably the quantity of material required for the element.

These objects are achieved according to the invention by using a metal wire knit as a damping insert which totally fills the cavity between the bellows and metal hose in a radial direction.

As a consequence of these measures, the metal hose is prevented from colliding with the interior wall of the bellows, since the cavity between these two parts is filled by the knit element flexibly, elastically and without gaps. In this design, the element is always in direct contact with both the bellows and the metal hose which will ensure a permanent damping of vibrations. Further, the use of a metal wire knit allows a considerable reduction of material consumption, compared with the conventional design, and the structure of the knit will avoid the contact between the bellows and the metal hose on one hand, and the element on the other hand, with the exception of a few small contact spots, which will reduce the wear between the components respectively. Nevertheless, the knit will, altogether, not have any negative effect on the flexibility of the bellows and the metal hose as it is a characteristic feature of a wire knit that its length may change in an axial direction without changing its radial dimensions. Thus, the characteristic of wire knit allows a considerable increase in the inherent damping of the metal wire element.

The installation of the knit will also not cause any problems, since the knit, due to its hose-like shape, can be pushed onto the metal hose. Another possibility, however, is the simultaneous manufacturing and installation of the knit which allows the immediate availability of an assembly, consisting of metal hose and metal wire knit, for further installation.

In this context, radial pre-setting of the element or its installation into the cavity is in pre-set relation to the bellows and/or the metal hose. As a consequence, there will be an additional mutual support between the bellows and the metal hose and also a desired damping effect, depending on the selected value of pre-setting adjustment.

As a principle, the structure of the knit, either narrow-meshed or wide-meshed, will have an influence on the damping effect and the elastic supporting properties of the knit element.

There are numerous possible versions of this element. In one version, the element may include a wire knit hose or wire knit ring covering at least a part of the axial length of the cavity. Depending on individual requirements, it is possible to fill the cavity in its total axial length with a wire knit hose. In another embodiment, several shorter hose sections with axial distances between them may be installed which may finally lead to the application of one or several wire knit rings, if very short hose sections are selected.

In yet another embodiment, the element may include at least one wire knit strip formed by helical windings and installed in the cavity, perhaps with axial distances between the neighboring windings. Depending on the design of the element, at least one of the element's ends can be fixed between the corresponding end fitting of the bellows and the end of the metal hose. Another possibility of fixing the element in an axial direction is to clamp an end of the knit element between the bellows and the metal hose by suitably profiling the bellows and/or the metal hose. Such a profiling may be a protuberance which is provided on the metal hose and which projects toward the knit element.

For the purpose of an appropriate adaptation of the damping and spring characteristics of the wire knit to individual requirements, the wire knit, of which the element consists, can be at least partly compressed, i.e. the basic wire knit is subject to compression before installation, in order to ensure high radial supporting and spring characteristics and also to increase both the internal friction of the element and the friction between the element on one hand, and the bellows and the metal hose on the other hand. Such compression can also be provided to the wire knit hose locally, for example to one or several sections of its overall length.

Another possibility of a sensitive setting of the wire knit element can be obtained by means of a profiled cross section in this element or of the wire knit from which it is made. This profiling of the wire knit can be formed by helical windings in radial direction in the cavity between the bellows and the metal hose, so that the element comes in alternating contact with either the bellows or the metal hose. There will always be an axial distance between individual contact spots. The profiled cross-section can also be the result of the corrugated geometric form of the wire from which the knit is made, which will have an interlocking effect on the neighboring individual meshes, and will also have a corresponding influence on the spring characteristics of the wire knit element.

In the wire knit itself, the metal wire which forms the knit may include several wire threads. On the one hand, this fact allows the use of especially thin threads, and on the other hand, threads of different materials or with different properties can be applied. Further, additional materials may be included with the wire of the knit, for example ceramic fibers or plastic fibers of high temperature resistance.

There is, however, also the possibility of applying a coating of another metal, a plastic material with high thermal resistance or graphite to the wire which forms the knit or to its threads, in order to adapt its operational characteristics to exterior influences such as temperature and corrosive substances, and to influence the sliding properties of the wire knit element, if required, and also its manufacturing costs, despite such differentiated operational characteristics.

Altogether, the subject of this invention is directed to at least one element arranged in the cavity between the bellows and the metal hose, which has a low weight due to the small amount of material required, but allows a high variety of versions or embodiments, for a sensitive and individual adaptation of its operation mode to individual conditions.

With respect to the general design of the conduit element, it can be conventionally provided with an external braided hose which is made of metal wire and which directly contacts the bellows. The ends of the bellows and the braided hose are connected within a cylindrical supporting ring and are pressed together with the ring to form the end fittings of the conduit element, with the parts connected with each other by means of fastening at single spots. Such an exterior braided hose is used for the protection of the bellows from exterior influences, and also as a support to prevent an undesirable longitudinal expansion of the bellows. For the manufacturing of the metal hose, it can be provided that this hose is wound from a metal strip, perhaps without a sealing insert, with the ends of the metal hose which are situated inside the end fittings of the bellows being radially expanded and with the hose profile being compressed simultaneously, thus compensating the tolerances between the hose ends and the bellows end fittings.

BRIEF DESCRIPTION OF THE DRAWINGS

FIGS. 1, 1a, 2, 3 and 4 show side elevations, partly in section, of a conduit element, with differing arrangements of the wire knit element.

DESCRIPTION OF THE PREFERRED EMBODIMENTS

Figure 1A:
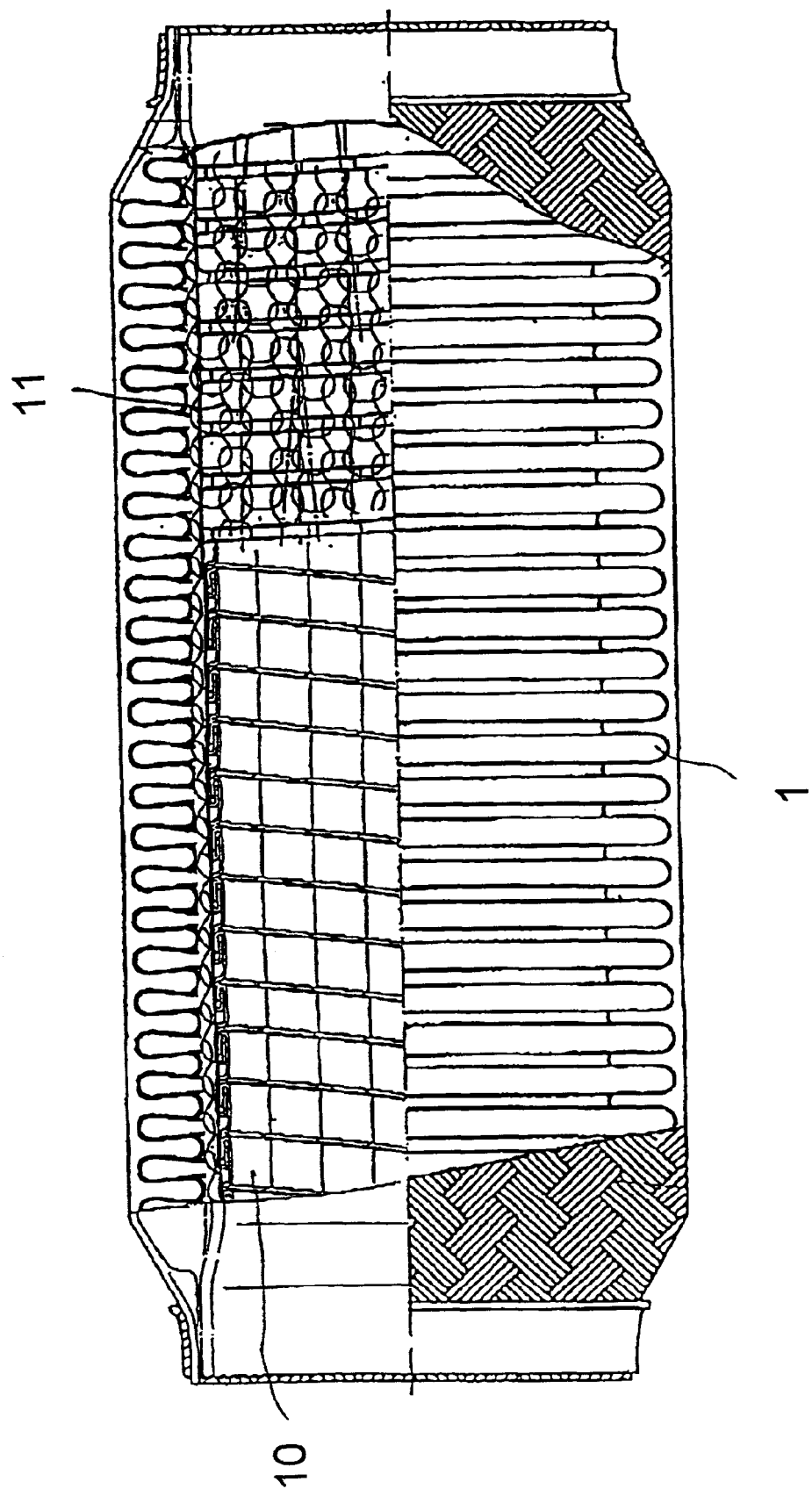

FIG. 1 shows a conduit element for the exhaust system of a vehicle. The conduit element includes an exterior, annularly corrugated metal bellows 1 with cylindrical end fittings 2, 3. The height of the exterior radial corrugation crests of the metal bellows 1 decreases towards these end fittings. This design allows the gradual adaptation of the diameter of an external braided hose 4 to the diameter in the zone of the end fittings, with the braided hose 4 being situated inside exterior supporting rings 5, 6 and being connected, together with these supporting rings, with the end fittings 2, 3 of the metal bellows 1 for example by spot welding 7. At the ends facing each other, the supporting rings 5, 6 are provided with rims 8, 9, in order to avoid compression of the edges between the supporting rings 5, 6 and the braided hose 4.

FIG. 1 shows that the inside diameter of the cylindrical end fittings 2, 3 of the metal bellows 1 is considerably smaller than the smallest inner diameter R1 of the corrugated section of the bellows 1. The smallest inner diameter R1 of the corrugated section is also referred to hereafter as the "free inside diameter" of the bellows 1.

A strip wound metal hose 10 with an interlocked profile and without a sealing insert is installed in the bellows 1. The outside diameter of the hose 10 is equal to the inside diameter of the bellows end fittings 2, 3. A radial distance exists between the largest outside diameter R2 of the metal hose 10 and the free inside diameter R1 of the bellows 1 in the corrugated section of the bellows 1, and thus a cylindrical space or cavity is provided between the parts 1 and 10.

Also referring to FIG. 1a, a wire knit hose 11 is inserted in the cylindrical cavity defined between the bellows 1 and the metal hose 10. The wire knit hose 11 hose radially fills the cylindrical cavity and, as may be observed, for example, in FIG. 1, it does not radially project beyond the cavity it occupies between the bellows 1 and the metal hose 10. Thus, the wire knit hose 11 acts as a support between bellows 1 and metal hose 10. According to the structure of the wire knit hose, the direct contact between the wire knit hose 11 and the metal hose 10 as well as the radial inward corrugations of the bellows is limited to individual spots, so that there is only a low mutual friction in the case of relative movements between bellows 1 and metal hose 10. On the other hand, this friction will cause a damping of these relative movements which will not only de-couple vibrations entering from outside but will also compensate for the vibrations caused by the natural frequency of both the bellows 1 and metal hose 10.

Additionally, the wire knit hose 11 acts as an elastic radial support between bellows 1 and metal hose 10, so that there is no impediment to their relative movements even if the conduit element is bent as a whole. As another effect of the elastic support, the direct contact between the wire knit hose on the one hand, and the bellows 1 and the metal hose 10 on the other hand is maintained, especially when the radial dimension of the wire knit hose requires installation between the bellows 1 and the metal hose 10 in a state of radial spanning (bias).

In the embodiment shown in FIG. 1, the ends of the wire knit hose 11 are fixed between the metal hose 10 and the end fittings 2, 3 of the bellows 1. Additionally, the metal hose 10, as can be seen from the alterations 12, 13 of the inside diameter of the metal hose 10, can be expanded in a radial direction by compressing the interlocked profile, and can then be pressed together in a radial direction with the end fittings 2, 3, the ends of the braided hose 4 and with the supporting rings 5, 6.

Figure 2:
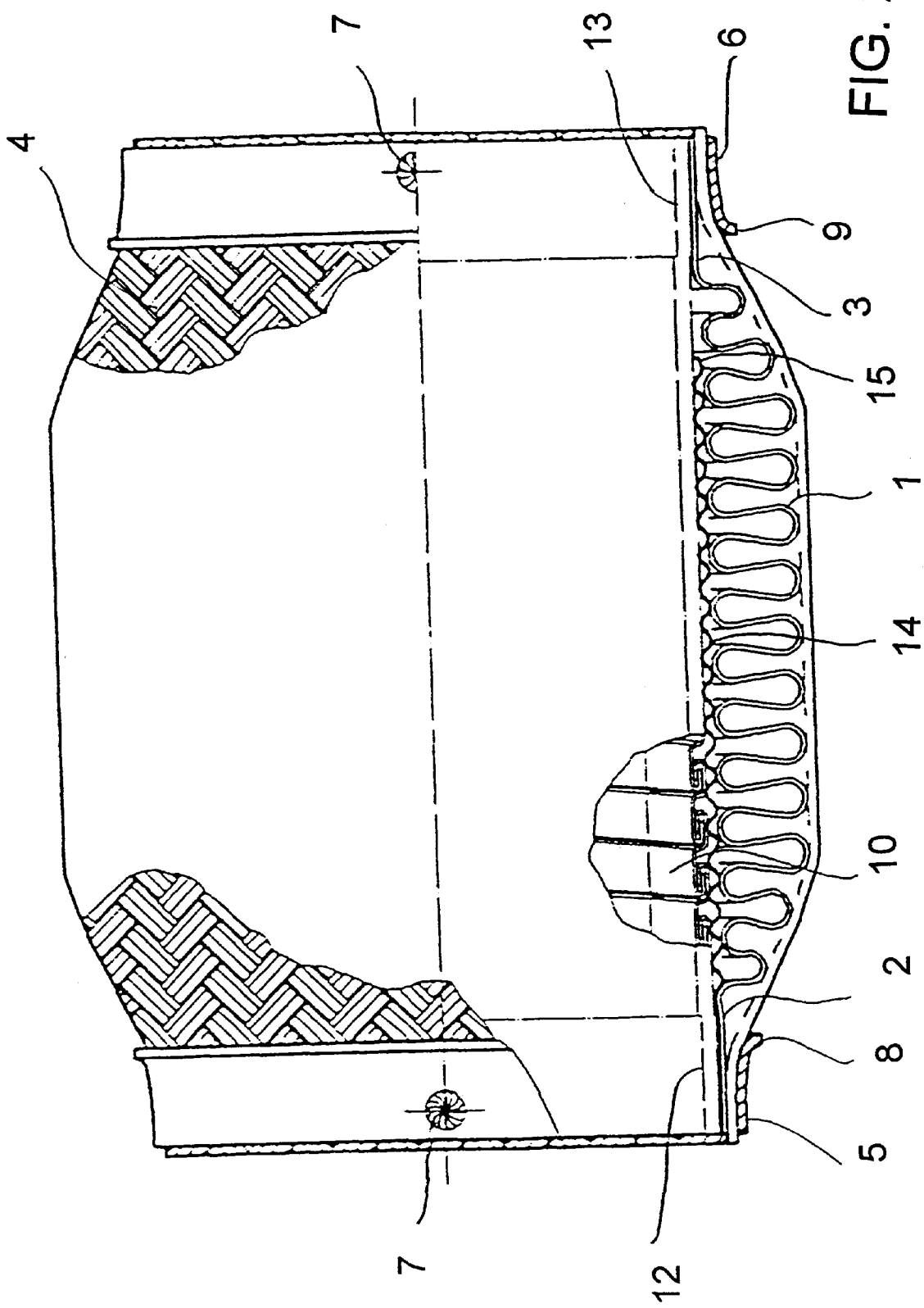

The embodiment according to FIG. 2 corresponds substantially to the embodiment according to FIG. 1. In this embodiment, however, only the left end of the wire knit hose 14 is fixed to the corresponding end of metal hose 10 and end fitting 2, whereas the right end 15 of the wire knit hose 14 lies free before the corresponding end of the conduit element. This design reduces the supporting effect of wire knit hose 14 in respect to axial movements of bellows 1 and metal hose 10, which may be desirable in individual cases. Further reduction of a wire knit hose 16 is provided in the embodiment according to FIG. 3, which shows that, at both axial sides, the wire knit hose ends at a considerable distance from the end fittings of the conduit element, so that both ends 17, 18 of wire knit hose 16 are free. As a consequence, the wire knit hose can yield at a high rate to the axial forces to which it is exposed within its range of axial mobility between the ends of the conduit element.

Figure 3:
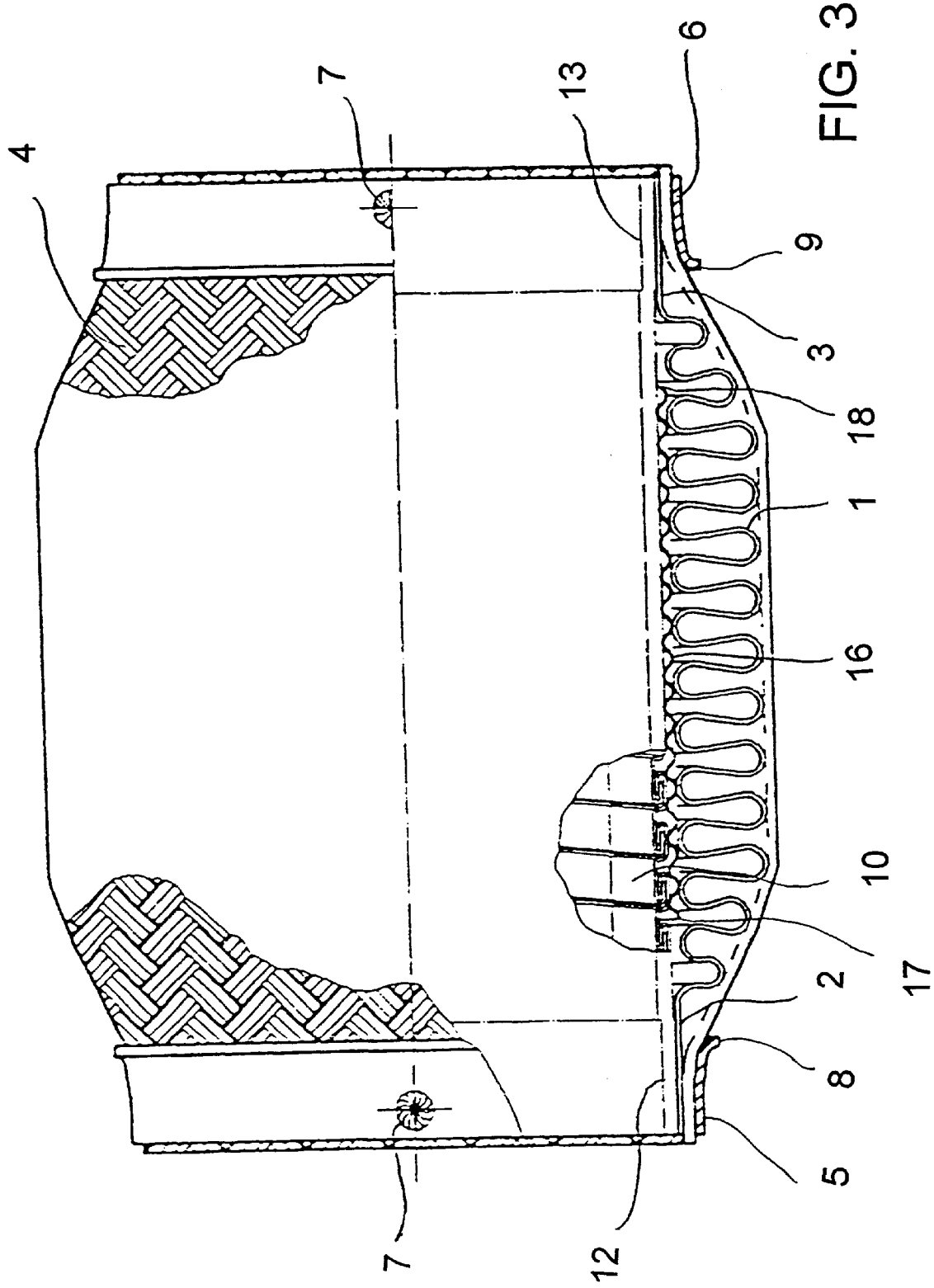
Figure 4:
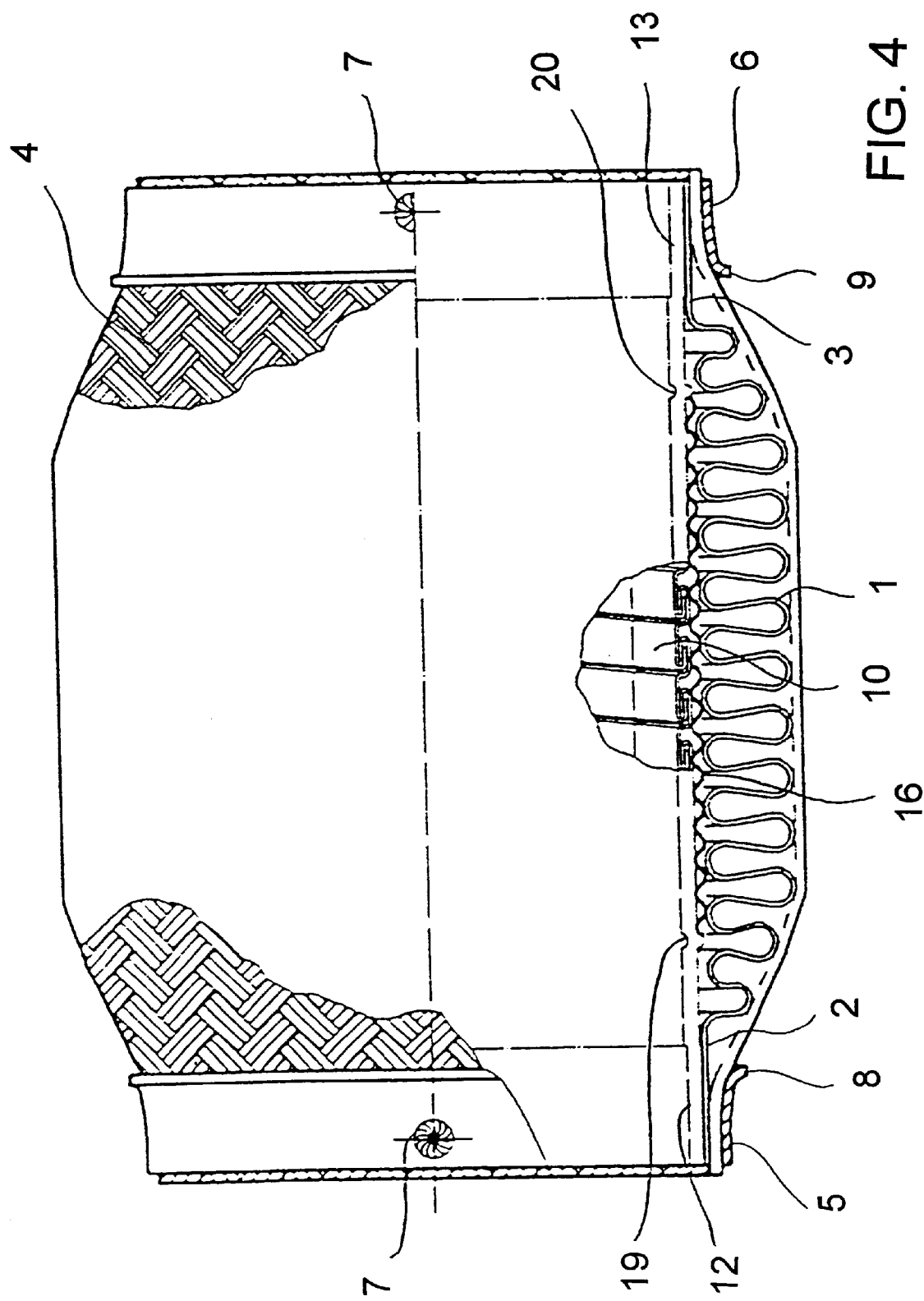

If, for certain reasons, a shorter wire knit hose 16 of the embodiment shown in FIG. 3 is to be fixed against axial movements, this can be done by the positive locking of an end of the wire knit hose by means of a corresponding interior profiling of bellows 1 or an exterior profiling of metal hose 10. FIG. 4 shows such an exterior profiling of metal hose 10, constituted by radial protuberances 19 and 20 extending toward the wire knit hose 16. Thus, the wire knit hose 16 is fixed (clamped) at its ends between the bellows 1 and the metal hose 10 by virtue of the protuberances 19 and 20.

In the embodiments according to FIGS. 1 to 4, the wire knit element 11, 14, 16 that is arranged in the cavity between bellows 1 and metal hose 10 has the shape of a hollow cylindrical hose. Each of the FIGS. 5 to 10 shows an axial section of the conduit elements described according to the FIGS. 1 to 4, partly in section, showing further design details of the wire knit element.

Figure 5:
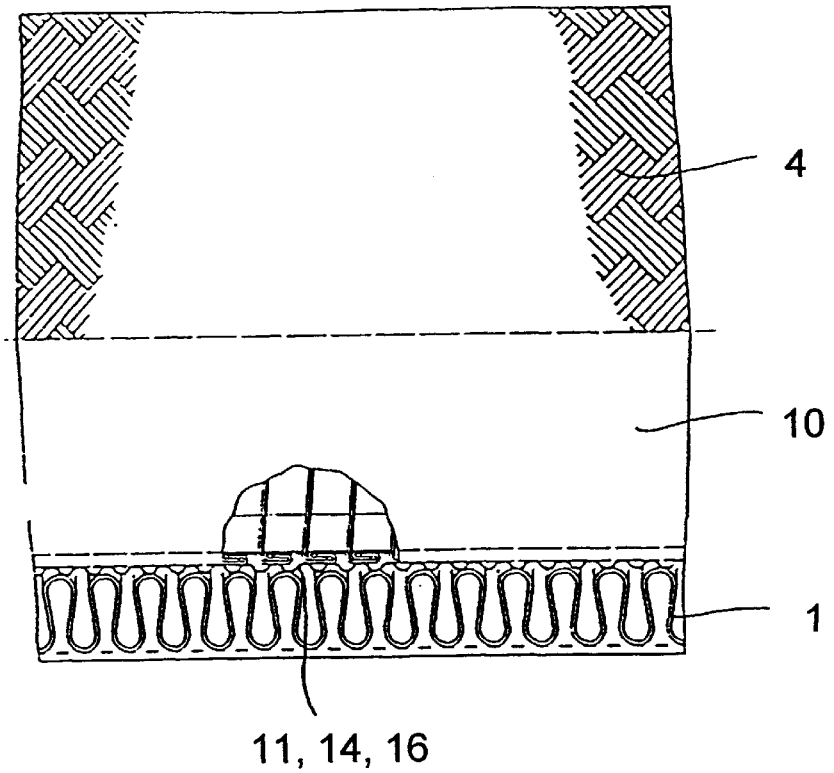
FIGS. 5, 6, 7, 8 and 9 show side elevations, partly in section, of a conduit element, with differing arrangements of the wire knit element.

FIG. 5 shows a section of the conduit element described according to the FIGS. 1 to 4, with a hose-shaped wire knit element 11, 14, 16 in the cavity between the bellows 1 and the metal hose 10.

Figure 6:
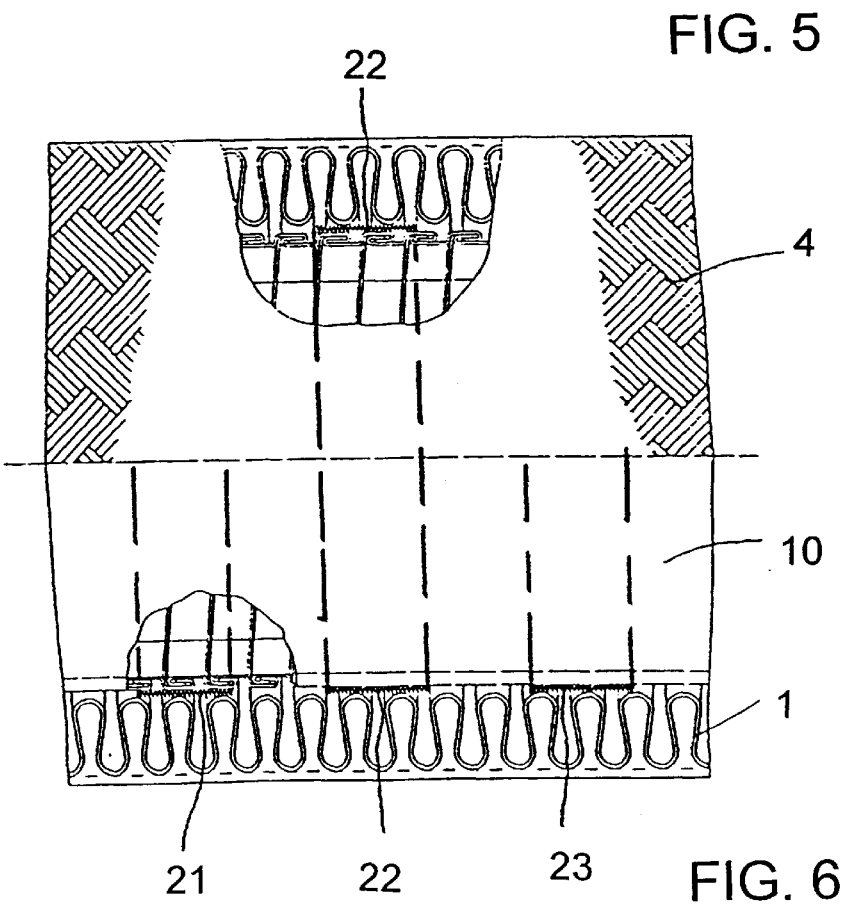

The embodiment according to FIG. 6 provides the use of wire knit rings 21, 22, 23 arranged with an axial distance between the individual rings. As a result, a mutual supporting effect in a radial direction and a damping effect will only occur in certain axial sections. The wire knit rings 21, 22 and 23 can move freely in an axial direction. If the potential displacement of these rings is to be avoided, this can be done by spanning (biasing) the rings radially in the cavity. It is also possible to apply the principle described according to FIG. 4, that is, to clamp an end of the knit rings 21, 22, 23 between the bellows 1 and the metal hose 10.

Figure 7:
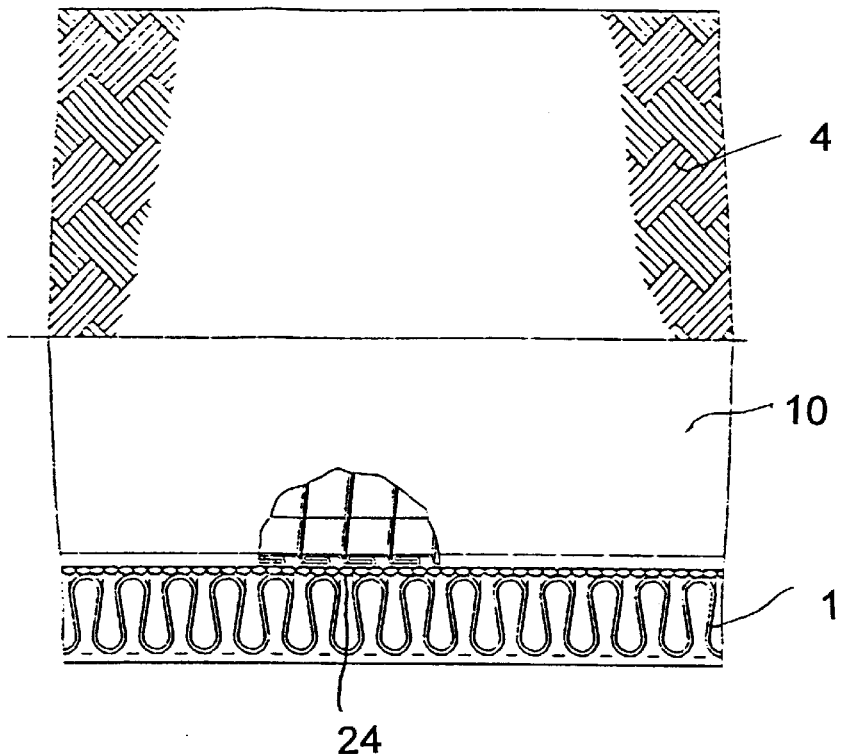

In the embodiment according to FIG. 7, a wire knit hose 24 is provided. As a difference to the embodiments previously described, the wire which forms the knit hose includes several threads. Such a multi-thread design may include several thin metal wires and additional materials, such as ceramic fibers, plastic fibers, and similar parts. The operational characteristics of the wire knit can thus be influenced in different ways, either in respect to its interior or exterior friction, its resistance to abrasion or to exterior influences such as thermal stress or corrosive influences of the environment.

Figure 8:
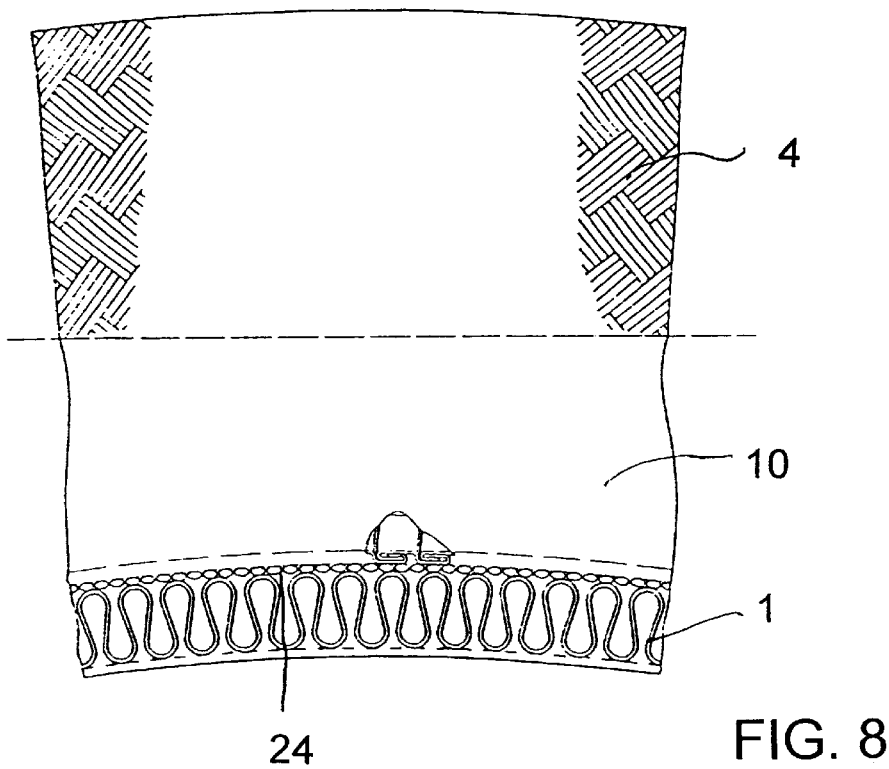

FIG. 8 shows the embodiment according to FIG. 7 in a bent conduit element. This Figure shows, as is applicable to all embodiments, that the wire knit element or hose is not an obstacle to movement of the conduit element, since the individual meshes connected with each other allow mutual displacement axially to the conduit element with only an insignificant change in the cross-section or the diameter of the wire knit element or hose. For this reason, the wire knit hose 24 within a bent conduit element according to FIG. 8 can be compressed at the interior bend and extended at the exterior bent without any difficulties.

Figure 9:
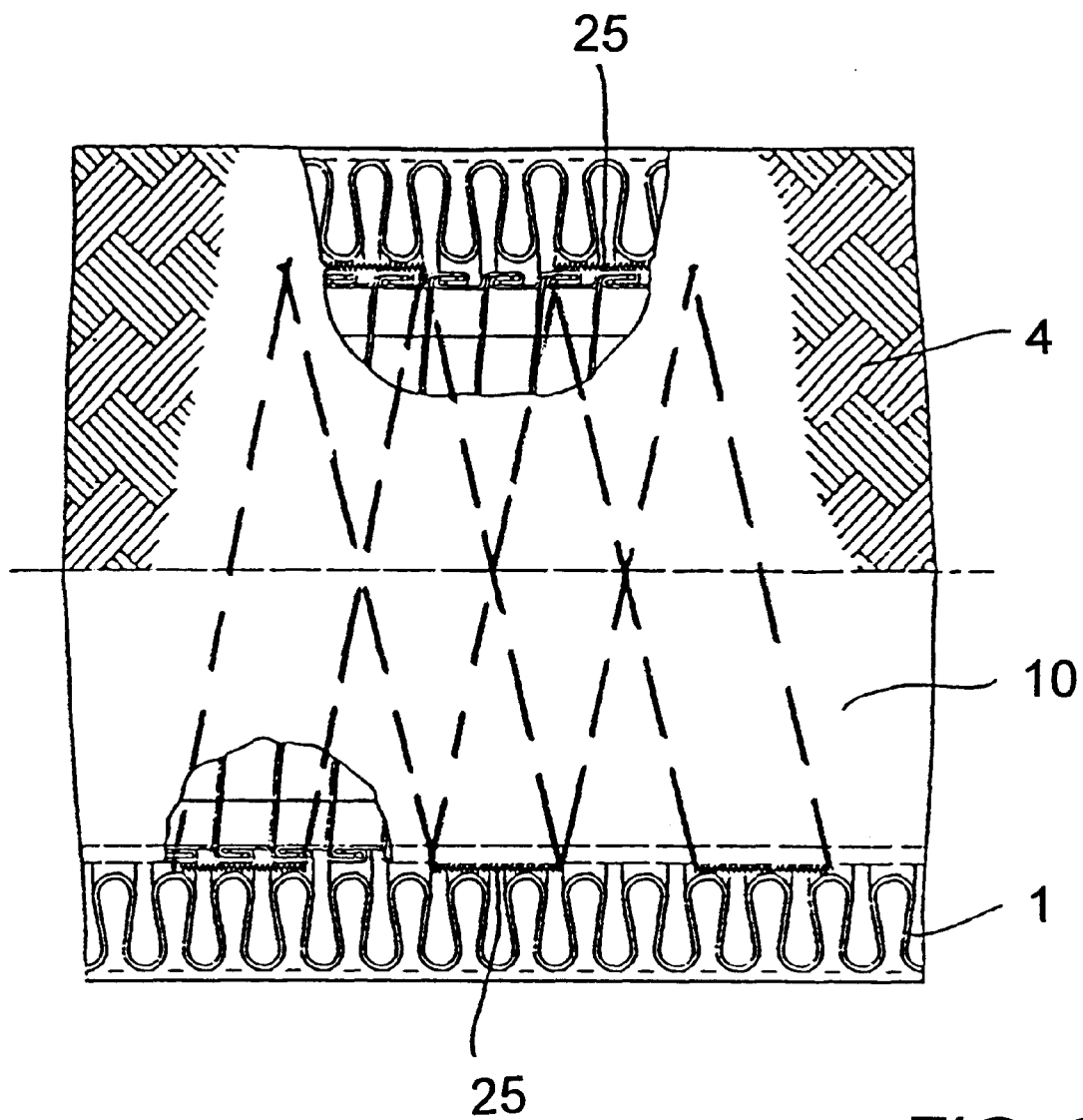

In the embodiment according to FIG. 9, the wire knit element is in the shape of a wire knit strip 25 which is wound helically around metal hose 10. At least one of the ends of such a wire knit strip can be fixed according to the methods described according to FIGS. 1 and 2. There is, however, also the possibility of fixing the end according to the method described according to FIG. 4, if this should be required or desired in individual cases.

The various preferred embodiments of the wire knit element can be applied individually or in combination within one conduit element. Special reference shall be made to the embodiment in which a wire knit element, consisting of a wire knit which has been compressed during manufacturing and has been kept in this condition by pressing, is applied. This design is shown in the versions according to FIGS. 6 and 9 by means of the narrow structure of the wire knit shown in these figures.

It will be apparent to those skilled in the art the various modifications can be made to the described, preferred embodiments of the invention without departing from the scope or spirit of the invention. The scope of the invention is to be construed in accordance with the following claims.

What is claimed is:

1. A flexible conduit comprising
    (a) a corrugated tubular metal bellows having a minimum inner diameter;
    (b) cylindrical end fittings secured to said bellows;
    (c) a metal hose disposed coaxially within said bellows and having a maximum outer diameter being less than said minimum inner diameter of said bellows;
    (d) a free annular cylindrical space situated between said bellows and said metal hose; said space having an outer diameter equaling said minimum inner diameter of said bellows and an inner diameter equaling said maximum outer diameter of said metal hose; and (e) a hollow cylindrical knit wire element positioned in said space; said element radially fully occupying said space without projecting radially therefrom.

2. The flexible conduit as defined in claim 1, wherein said element is radially tensioned against one of said bellows and said metal hose.

3. The flexible conduit as defined in claim 1, wherein said element comprises an axially extending knit hose.

4. The flexible conduit as defined in claim 1, wherein said element comprises a knit ring.

5. The flexible conduit as defined in claim 1, wherein said element comprises a knit strip wound helically about said metal hose.

6. The flexible conduit as defined in claim 5, wherein said knit strip is composed of helical turns spaced axially from one another.

7. The flexible conduit as defined in claim 1, wherein said element has an end secured between one of said end fittings and an adjoining end of said metal hose.

8. The flexible conduit as defined in claim 1, wherein said element has an end located at a distance from said end fittings; further comprising immobilizing means for fixing said end between said bellows and said metal hose.

9. The flexible conduit as defined in claim 8, wherein said means comprises a protuberance provided on one of said bellows and said metal hose for clamping said end between said bellows and said metal hose.

10. The flexible conduit as defined in claim 1, wherein said element has a compressed portion.

11. The flexible conduit as defined in claim 1, wherein said element has a profiled cross section.

12. The flexible conduit as defined in claim 1, wherein said knit wire element is formed of a wire composed of a plurality of threads.

13. The flexible conduit as defined in claim 12, wherein said threads are of different material.

14. The flexible conduit as defined in claim 12, wherein said threads have different properties.

15. The flexible conduit as defined in claim 1, wherein said wire includes ceramic fibers.

16. The flexible conduit as defined in claim 1, wherein said wire includes high-temperature resistant synthetic fibers.

17. The flexible conduit as defined in claim 1, wherein said wire has a coating made of a metal different from the metal of the wire.

18. The flexible conduit as defined in claim 1, wherein said wire has a coating has a high-temperature resistant synthetic coating.

19. The flexible conduit as defined in claim 1, wherein said wire has a coating has graphite coating.

* * * * *